A. C. TAYLOR.
WATER COOLED WELDING ELECTRODE FOR ELECTRIC SPOT WELDING MACHINES.
APPLICATION FILED NOV. 1, 1912.
1,058,677.
Patented Apr. 8, 1913.
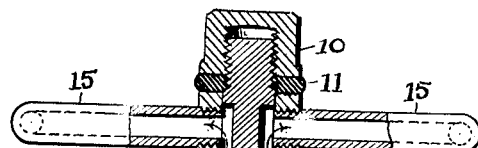
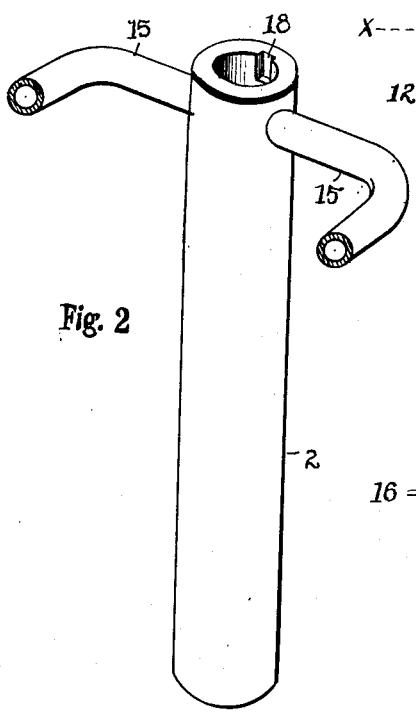
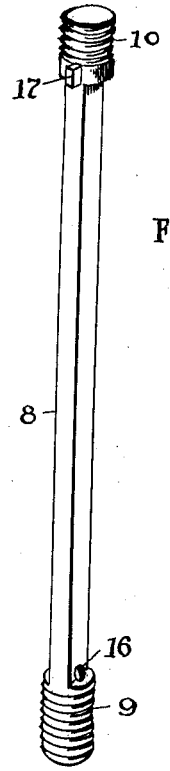
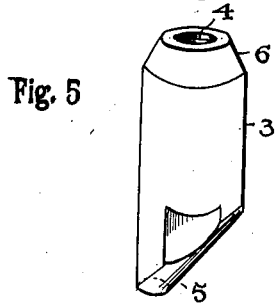
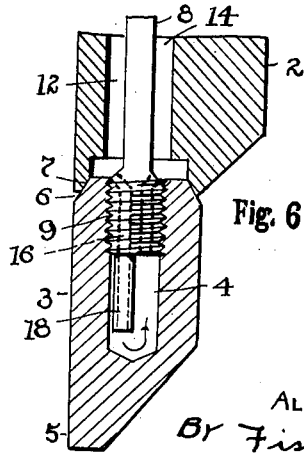
INVENTOR
ALBERTIS C. TAYLOR

UNITED STATES PATENT OFFICE.

ALBERTIS C. TAYLOR, OF WARREN, OHIO, ASSIGNOR TO THE WINFIELD MANUFACTURING COMPANY, OF WARREN, OHIO, A CORPORATION.

WATER-COOLED WELDING-ELECTRODE FOR ELECTRIC SPOT-WELDING MACHINES.

1,058,677.  Specification of Letters Patent.  Patented Apr. 8, 1913.

Application filed November 1, 1912. Serial No. 729,011.

*To all whom it may concern:*

Be it known that I, ALBERTIS C. TAYLOR, a citizen of the United States, residing at Warren, in the county of Trumbull and State of Ohio, have invented certain new and useful Improvements in Water-Cooled Welding-Electrodes for Electric Spot-Welding Machines, of which the following is a specification.

My invention relates to improvements in water cooled welding electrodes or welding points for electric spot-welding machines, and the improvement comprises a construction and arrangement of parts substantially as herein shown and described and more particularly pointed out in the claims.

In electric spot-welding machines wherein solid welding electrodes or so-called welding points of copper are used to conduct the electric current and make the weld, the means for holding the electrodes usually comprise clamping devices and also suitable supports to bring the electrodes into pressure engagement with the work. In some instances the said supports have been provided with water-circulating passages adjacent to the electrodes to keep them measurably cool.

The object of the present invention is to provide a sectional electrode of simple and practical construction wherein the parts are particularly related and arranged to circulate a cooling medium internally through the length of the electrode and its separate and removable welding end.

In the accompanying drawings, Figure 1 is a vertical section through the electrode in its entirety. Fig. 2 is a perspective view of the tubular body of the electrode. Fig. 3 is a cross section of the electrode on line x—x, Fig. 1. Fig. 4 is a perspective view of the flat-sided bolt which extends centrally through the tubular body of the electrode, and Fig. 5 is a perspective view of the actual welding member comprising the removable point or tip of the electrode. Fig. 6 is a sectional view illustrating a modification of the invention.

The improvement comprises a round tubular body 2 of copper, or other material of good electrical conductivity, and a separate removable point or tip member 3 which is provided with a central bore 4 extending nearly to its tapered welding extremity 5. The upper end 6 of this member 3 is beveled, tapered or otherwise formed to fit within a flaring seat or socket 7 within the lower end of said body 2, and the means for securing the separate member 3 as an extension to body 2 consists of a steel or iron bolt 8 having a lower screw-threaded end 9 adapted to engage with the threaded part of bore 4. The upper end of bolt 8 is also threaded and projects above the top of body 2 where it is engaged by a cap nut 10, which is seated upon a washer 11 of rawhide or other yielding and expansible material to make a fluid-tight joint and to allow for unequal expansion between the copper parts of the electrode and the steel bolt 8. Bolt 8 is of the same diameter as the bore of body 2 and fits snugly therein, but is cut away or reduced at opposite sides thereof between its threaded ends to provide separate passages 12 and 14 within the body 2 for free circulation of water lengthwise of the electrode, the water entering through one of the two top branch tubes 15 and discharging through the other after passing into and out of the bore 4 of the removable member 3 by way of the two openings or channels 16 in the bottom end of bolt 8. The water connections with branch tubes 15 may be by flexible hose or any other suitable means, and are intended to be detachable; and the electrode or welding point in its entirety is also designed to be a removable part of the holder of the welding machine.

Bolt 8 is a stud-bolt shown as having a lateral projection or lug 17 at its upper end, see Fig. 4, which is adapted to seat within the groove 18 in the top of tubular body 2, see Fig. 2, when the parts are assembled, thereby fixing the bolt within the said body so that the separate passages 12 and 14 always coincide with the intake and outlet tubes 15. The bolt is also thereby locked against independent rotation when either the welding end member 3 is rotated for adjustment or setting, or the cap nut 10 is screwed in place to tighten and fix the parts together. However, groove 18 is long enough to permit an end movement of the lug therein in fastening the bolt and the other parts together. A rigid and stable fastening is required in view of the pressure applied to the welding end member 3 in making a spot-weld, particularly if the extreme welding point is off-center as shown, and this result is promoted by the bolt 8 which fits snugly and has sustaining engagement the full length of the tubular body and has a rigid attachment with member 3. A firm connection is also necessary to maintain fluid-tight joints and a good electric-current conducting union between body 2 and its end member 3. The steel bolt adds strength to the tubular body, alines the members, and as constructed, displaces a minimum amount of copper. But if a greater cross-sectional area of copper is desired to promote conductivity of the electric current, the diameter of body 2 may be considerably enlarged over the point member 3, see Fig. 6. This is especially desirable where body 2 is required to be extra long. In this larger body the bolt itself may be at one side of the axial center as shown in Fig. 6. In this figure, a small copper tube 18 is also affixed to the end of bolt 8 at one of the passages 16, and by this extension into the bore 4 the circulation of water is made more efficient and positive and insures perfect cooling of the welding end member 3 throughout its length.

What I claim is:

1. In an electric spot-welding electrode, a tubular body having fluid connections, a separate point member, and a locking bolt for said member engaged lengthwise in sustaining relation with the inner wall of said body.

2. In an electric spot-welding electrode, a tubular body having fluid connections, a separate point member, and a locking bolt for said member engaged lengthwise in sustaining relation with the inner wall of said body and sub-dividing the interior of said tubular body into circulating passages for the cooling fluid.

3. In an electric spot-welding electrode, a tubular body having fluid connections, a separate point member, a bolt for said member sub-dividing the interior of said body into separate water-circulating passages, and means to prevent rotation of said bolt within said body.

4. In an electric spot-welding electrode, a body having a bore therein and a separate welding end member, means to fasten said member in fixed position comprising a bolt reduced between its ends to provide separate passages within the bore of said body, and branch tubes open to the interior of said bore at opposite sides of said bolt.

5. In an electric spot-welding electrode, a cylindrical body having a chamber lengthwise thereof and branch tubes open to said chamber, a separate welding member at the end of said body, a fastening bolt for said member extending through said chamber and engaged with the wall thereof on two opposite sides and spaced apart therefrom otherwise, and a nut for said bolt.

6. In an electric spot-welding electrode, a hollow body having a separate welding member at its end, a flat-sided bolt sub-dividing said hollow body and screw-engaged with said end member, and means to circulate a cooling fluid through said body on opposite sides of said bolt.

7. An electric spot-welding electrode having a bore lengthwise thereof and water-circulating branch tubes open to said bore at its upper end, and a solid core member extending through said bore and dividing the same into separate passages having open communication with each other at the bottom welding end of said electrode.

8. In an electric spot-welding electrode, a cylindrical body having a bore with a fluid inlet and outlet at its top and provided with a hollow welding end, and a bolt sub-dividing said bore into separate passages and having channels in its lower end opening into said hollow welding end.

9. In an electric spot-welding electrode, a tubular body having branch tubes, a hollow welding end member, a bolt having threaded ends and reduced sides and adapted to snugly fit lengthwise within said tubular body and screw-engage said end member, and a nut and washer for said bolt at the upper end of said body.

10. An electric spot-welding electrode comprising a tube, a separate hollow end member, a bolt extending through said tube and having slidable interlocking engagement with said tube, and means to draw said bolt lengthwise of the tube to fasten said end member in place.

11. An electric spot-welding electrode comprising a tube, a separate hollow end member, and a locking bolt for said member having threaded ends and reduced in cross section between said ends and having separate passages under the threads at one end.

12. A sectional welding electrode having a locking bolt cut away in part between its ends to provide separate fluid passages within said electrode.

13. A sectional welding electrode and a stud-bolt therefor having portions cut away lengthwise on its outer surface to provide separate fluid passages for said electrode.

14. A welding electrode and a stud-bolt providing separate fluid passages within said electrode between the threaded ends of said stud-bolt, one of the threaded ends of said stud-bolt having drilled channels lengthwise therethrough.

15. A sectional electrode body and a locking stud-bolt therefor and means to prevent said stud-bolt from rotating within said body.

16. A sectional welding electrode having a locking stud-bolt constructed to provide separate fluid passages between its threaded ends and having drilled channels lengthwise through one end and an extension tube for one of said drilled channels.

17. A welding electrode comprising a tubular body and a removable end member of different diameters, said end member being eccentrically related and flush at one side with said tubular body.

18. A welding electrode comprising a cylindrical body having an eccentric bore, a separate welding end member of less diameter than said body seated in alinement with said bore, and means to secure said end member removably in place.

In testimony whereof I affix my signature in presence of two witnesses.

ALBERTIS C. TAYLOR.

Witnesses:
 CHARLES FILLINS,
 W. D. BYARD.